United States Patent [19]

Sakamura et al.

[11] Patent Number: 5,307,474
[45] Date of Patent: Apr. 26, 1994

[54] APPARATUS AND METHOD FOR PROCESSING LITERAL OPERAND COMPUTER INSTRUCTIONS

[75] Inventors: Ken Sakamura, Tokyo; Jiro Korematsu, Itami, both of Japan

[73] Assignee: Mitsubishi Denki Kabushiki Kaisha, Japan

[21] Appl. No.: 882,743

[22] Filed: May 11, 1992

Related U.S. Application Data

[63] Continuation of Ser. No. 560,253, Jul. 30, 1990, abandoned, which is a continuation of Ser. No. 172,630, Mar. 24, 1988, abandoned.

[30] Foreign Application Priority Data

Sep. 30, 1987 [JP] Japan .............................. 62-246623

[51] Int. Cl.⁵ .............................................. G06F 12/10
[52] U.S. Cl. ............................ 395/425; 364/DIG. 1; 364/259.8; 364/262.9; 364/951.3; 395/400
[58] Field of Search ... 364/200 MS File, 900 MS File; 395/400 MS, 425 MS

[56] References Cited

U.S. PATENT DOCUMENTS

| | | | |
|---|---|---|---|
| 3,916,388 | 10/1975 | Shimp et al. | 364/749 |
| 3,970,999 | 7/1976 | Edward | 364/200 |
| 4,037,213 | 7/1977 | Atkins et al. | 364/200 |
| 4,224,677 | 9/1980 | Kindell et al. | 364/900 |
| 4,240,144 | 12/1980 | Kindell et al. | 364/200 |
| 4,247,891 | 1/1981 | Flynn et al. | 364/200 |
| 4,268,909 | 5/1981 | Kindell et al. | 364/200 |
| 4,272,828 | 6/1981 | Negi et al. | 364/900 |
| 4,323,964 | 4/1982 | Gruner | 364/200 |
| 4,408,271 | 10/1983 | Kindell | 364/200 |
| 4,430,711 | 2/1984 | Anderson et al. | 364/200 |
| 4,433,377 | 2/1984 | Eustis et al. | 364/200 |
| 4,502,115 | 2/1985 | Eguchi | 364/200 |
| 4,542,476 | 9/1985 | Nagafuji | 364/749 |
| 4,584,666 | 4/1986 | Zolnowsky et al. | 364/900 |
| 4,663,732 | 5/1987 | Robinson | 364/900 |
| 4,677,582 | 6/1987 | Nagafuji | 364/749 |
| 4,709,226 | 11/1987 | Christopher | 364/715.01 |
| 4,761,755 | 8/1988 | Ardini, Jr. et al. | 364/749 |

OTHER PUBLICATIONS

MC68020 32-Bit Microprocessor User's Manual Motorola Corp., Prentice-Hall, Inc.
INTEL, "iAPX 86/88, 186/188 User's Manual, Hardware Reference", 1985, pp. 41-51.
Motorola, "M68000 16/32-Bit Microprossor, Programmer's Reference Manual", Prentice-Hall, 1984, pp. 59, 69-72, 144.
Motorola, "M68020 32-Bit Microprossor, User's Manual", Prentice-Hall, 1984, pp. 9, 22-25, 42-43.
IBM Technical Disclosure Bulletin-vol. 15-No.4 Variable-Width Adder for MP Computers, J. L. Rosenfeld pp. 1149-1150.
Section 2.4.9 from "Series 3200 Programmer's Reference Manual" of National Semiconductor Corporation.

*Primary Examiner*—Joseph L. Dixon
*Assistant Examiner*—Reba I. Elmore
*Attorney, Agent, or Firm*—Townsend and Townsend

[57] ABSTRACT

A data processor of this invention capable of extending the expressible range of constant data in which a portion of the expressible range not necessary for an instruction is removed from that range and the vacancy thus made is utilized for extending the range of data necessary for the instruction.

6 Claims, 7 Drawing Sheets

Fig. 2

| LITERAL | OPERAND | | |
|---|---|---|---|
| | #3z | #3n | #3c |
| 0 0 0 | 0 | 8 | −8 |
| 0 0 1 | 1 | 1 | −7 |
| 0 1 0 | 2 | 2 | −6 |
| 0 1 1 | 3 | 3 | −5 |
| 1 0 0 | 4 | 4 | −4 |
| 1 0 1 | 5 | 5 | −3 |
| 1 1 0 | 6 | 6 | −2 |
| 1 1 1 | 7 | 7 | −1 |

APPARATUS AND METHOD FOR PROCESSING LITERAL OPERAND COMPUTER INSTRUCTIONS

This is a continuation of application Ser. No. 07/560,253 filed Jul. 30, 1990, now abandoned, which is a continuation of application Ser. No. 07/172,630, filed Mar. 24, 1988, now abandoned.

BACKGROUND OF THE INVENTION

1. Field of the Invention

This invention relates to a data processor, more particularly to a data processor which utilizes constant data (literal) contained in an instruction.

2. Background of the Prior Art

Constant data (literal) included in an instruction utilized in a conventional processor has a narrow expressible constant range because of its inherent nature that the data itself is included within the instruction to result in a limited bit width.

Therefore, when constant data exceeding the expressible range is required, (1) the same instruction has to be repeated a number of times, or (2) an instruction whose width is greater than the one containing constant data must be used, or (3) other instructions which necessitate the use of a main storage means must be used.

The conventional data processor increases the number of its instructions in such a case, which consequently lowers the overall efficiency of the data processor.

SUMMARY OF THE INVENTION

The present invention aims at eliminating the above mentioned problem and accordingly, it is the main object of this invention to provide a data processor which is capable of utilizing constant data with a larger bit width in a smaller number of instructions.

The data processor 601, having a memory 604 and an instruction register 606, according to the present invention is constructed in such a way that the range expressible of constant data contained within an instruction can be changed according to that instruction. More precisely explained, a portion of expressible the range of constant data which is not necessary for the instruction is removed from the range and the vacancy thus made is utilized to extend the range of data for the instruction.

According to one embodiment of the invention, a data processor comprises an instruction execution unit which executes an instruction, and an instruction decode unit which decodes an instruction being read-out from a main storing device and including constant designation fields directly fed to the instruction execution unit, and which generates a control signal according to the decoded result of the instruction, wherein the value of a first constant which is generated from the bit stream and the constant designation field of a first instruction and which is directly introduced into the instruction execution unit and the value of a second constant which is generated from the bit stream in the constant designation field of a second instruction and which is directly introduced into the instruction execution unit are different from each other with respect to the instruction in which the width of the constant designation field of the first instruction and that of the second instruction are equal, and the bit stream in the constant designation field of the first instruction and that of the second instruction coincide with each other.

The above and further objects and features of the invention will more fully be apparent from the following detailed description with accompanying drawings.

BRIEF DESCRIPTION OF THE DRAWINGS

FIG. 2 is a table showing literal operand values of three bit literals;

FIG. 3C is a schematic depiction of the format of an arithmetical shift instruction with a field showing the generating condition of operand values according to the kind literals;

FIG. 3D is a schematic depiction of the format of a branch instruction with a field showing the generating condition of operand values according to the kind of literals;

DESCRIPTION OF THE PREFERRED EMBODIMENTS

Figure 1A:
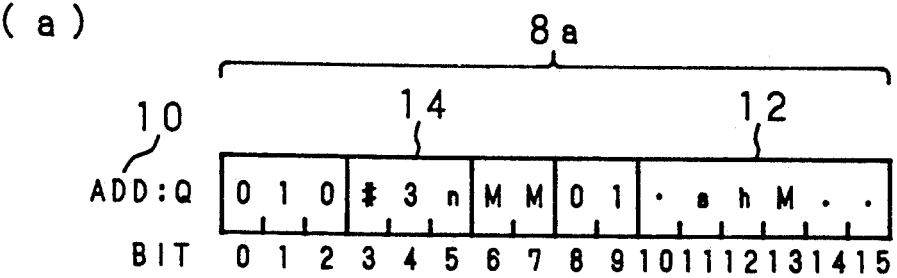
FIG. 1A is a schematic format showing an example of an add instruction field arrangement including constant data (literal)

Referring to the drawings, an embodiment of the present invention will now be explained.

FIGS. 1(a) to (d) show an example of the field arrangement 8a through 8d of instructions including the constant data (hereinafter called "literal") according to the data processor 601 of the present invention, which is detailed disclosed in Japanese Patent Application No. 62-247418 (1987) and others, U.S. Ser. No. 07/173,501 applied for by one of the inventors of the present invention under the title "DATA PROCESSOR".

In FIG. 1(a), the ADD:Q instruction 10 is an add instruction for adding a destination operand (represented by ShM 12 in the ADD:Q instruction) and a source operand (represented by #3n 14 in the ADD:Q instruction). The source operand #3n 14 of this instruction is literal and has a bit width of 3 bits.

Figure 1B:
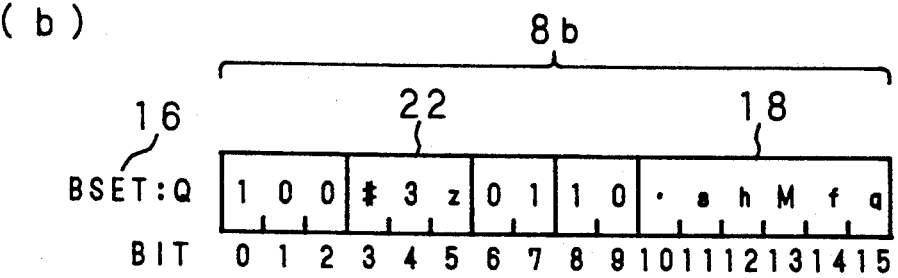
FIG. 1B is a schematic format showing an example of a bit set instruction field arrangement including constant data (literal)

The BSET:Q instruction 16 in FIG. 1(b) is a bit set instruction for setting the bits at an address which is the sum the base (represented by ShMfq 18 in the BSET:Q instruction) and an offset (represented by #3z 22 in the BEST:Q instruction) to 1. The source operand #3z 22 of this instruction is literal and has a bit width of 3 bits.

Figure 1C:
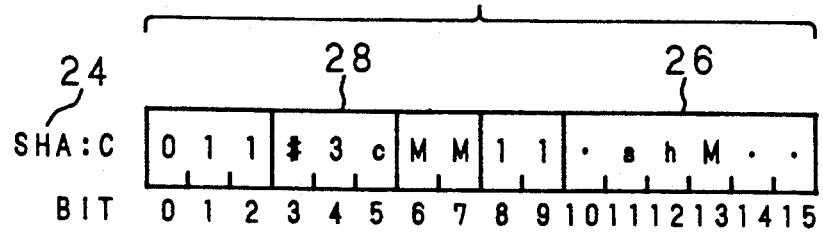
FIG. 1C is a schematic format showing an example of an arthmatical shift instruction field arrangement including constant data (literal)

The SHA:C instruction 24 in FIG. 1(c) is an arithmetical shift instruction for arithmetically shifting a destination operand (represented by ShM 26 in the SHA:C instruction) 24 by the number of bits designated by a source operand (represented by #3c 28 in the SHA:C instruction). The source operand #3c 28 of this instruction is literal and has a bit width of 3 bits.

Figure 1D:
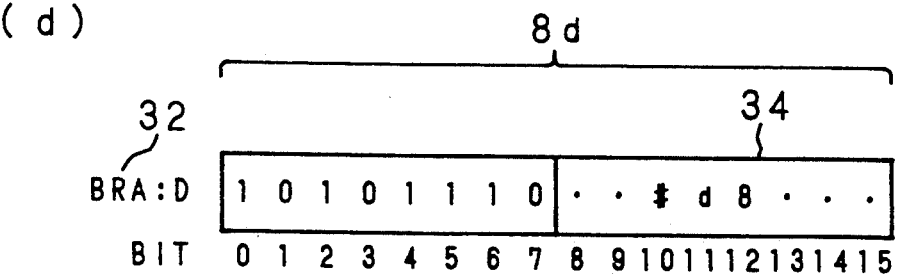
FIG. 1D is a schematic format showing an example of a branch instruction field arrangement including constant data (literal)

The BRA:D 32 instruction in FIG. 1(d) is a branch instruction for indicating that the instruction whose address is calculated by adding the address of the instruction being executed and a relative value obtained from #d8 34 which is the next instruction to be executed.

The range of an operand value which can be expressed by a literal of 3 bits is 0 to 7.

The operand value herein mentioned is that value which is of directly fed to the execution unit (an ALU 602 for instance) in a data processor and whose width is 32 bits in the case of the data processor according to the present invention of a 32-bit type. When the range of an operand value which can be expressible by a literal is of only one kind, an unnecessary range of an instruction operand may occur.

For example, in the case of the ADD:Q instruction in FIG. 1(a), since an addition of 0 is not a conceivable operation except for special cases, 0 is not necessary as an operand value. Therefore, by providing a plurality of literals in 3 bits, #3n, #3z and #3c as shown in FIG. 1 and making the range of an operand value expressible by a literal vary according to the instruction concerned, these literals as used can have a wider range of operand values.

To clarify the difference of the operand values expressible by the literal expressions in the fields #3z, #3n and #3c 14, 22, 28 shown in FIGS. 1(a)–1(d), the table in FIG. 2 shows the relationship between the literal values and the operand values.

As clearly seen from FIG. 2, at the literal value of 3 bits "000", the operand value of #3z 22 is 0, the operand value of #3n 14 is 8, and the operand value of #3c 28 is −8. The operand values which the literal #3z 22 can take range from 0 to 7 ($+2^3-1$). The operand values which the #3n 14 literal can take range from 1 to 8 ($+2^3$). The operand values which the #3c 28 literal can take range from −1 to −8 ($+-2^3$).

Although a 3-bit literal is shown in FIGS. 1A–1D and 2 as an example, an instruction with a 4-bit or a 6-bit literal (TRAPA, ABC:Q instruction and the like for example) is similarly arranged as in the case of a 3-bit literal.

In the case of the BRA:D instruction 32 in FIG. 1(d), the constant data #d8 34 is doubled to obtain the relative value. This is because there are only even numbers as branched addresses, and therefore, having odd number addresses will be meaningless. When a literal has a length of 8 bits, the range which the relative value can take is from 0 to 510 ($+2\times(2^8-1)$). In this case however, the relative value contains even numbers only.

Generally speaking, the operand values which a #Nz (a literal of N bits) can take range from 0 to $2^N-1$. The operand value which a #Nn can take range from 1 to $2^N$. The operand values which a #Nc can take range from −1 to $-2^N$. In the case of a #dN, the operand values are even numbers ranging from 0 to $2\times(2^N-1)$. The difference between the #Nz and the #Nn is that when all the literal values of N bits are 0, the operand value is 0 (in the case of the #Nz) or 2 (in the case of #Nn). The operand values of the #Nc are the twos complement of the literal values.

FIGS. 3(a)–(d) show a method to extend each instruction shown in FIGS. 1(a)–(d) to operand values of 32 bits 35a through 35d.

Figure 3A:
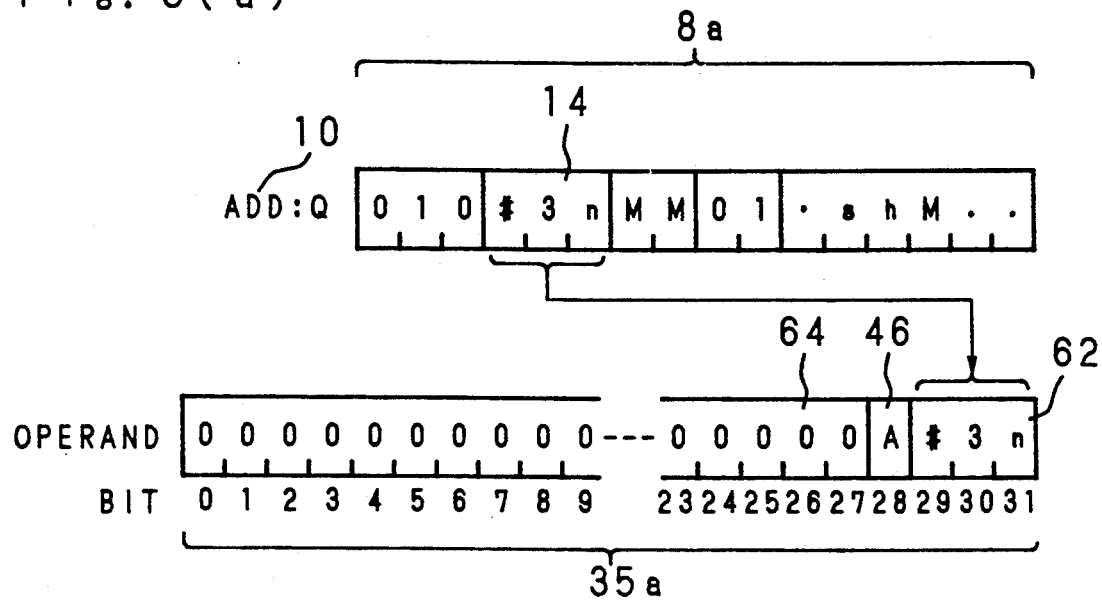
FIG. 3A is a schematic depiction of the format of an add instruction with a field showing the generating condition of operand values according to the kind of literal.

In the case of the ADD:Q instruction 10 shown in FIG. 3(a), the 3 bits of the literal #3n 14 enter bit 29 to bit 31 (62) of the 32-bit operand and 0 enters the bit 0 to bit 27 (64). Bit 27 46 (A in FIG. 3(a)) is occupied by 1 only when all of the 3 bits of the literal are 0. Bit 28 (46) is occupied by 0 in all the other cases.

Figure 3B:
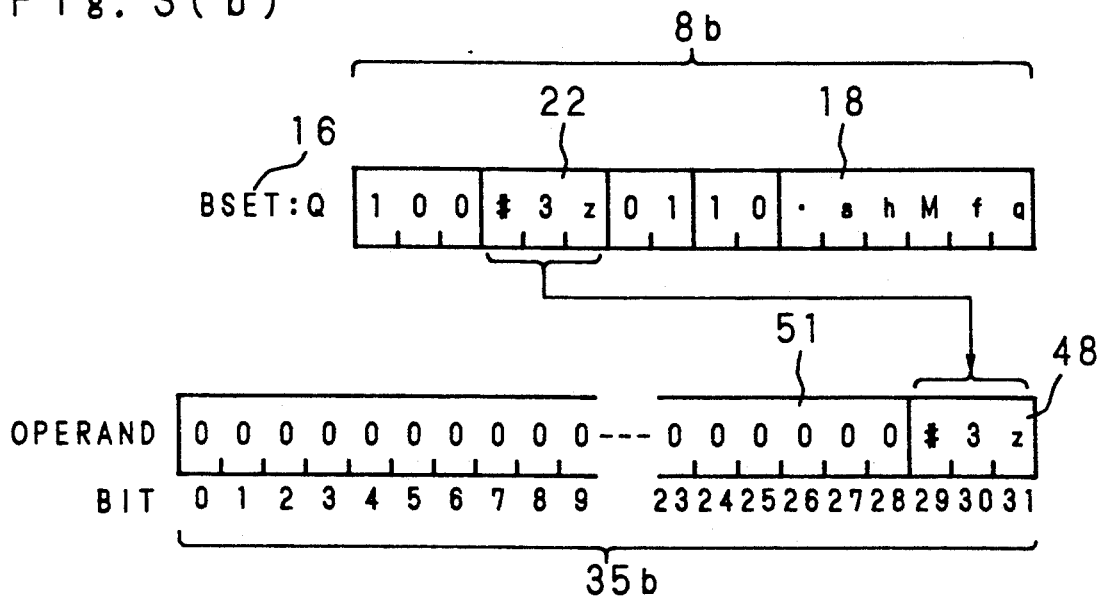
FIG. 3B is a schematic depiction of the format of a bit set instruction with a field showing the generating condition of operand values according to the kind of literals.

In the case of the BSET:Q instruction 16 shown in FIG. 3(b), the literal #3z 22 enters bit 29 to bit 31 (48) of the 32-bit operand and 0 enters bit 0 to bit 28 (53).

In the case of the SHA:C 24 instruction shown in FIG. 3(c), the literal #3c 28 enters bit 29 to bit 31 (82) of the 32-bit operand and 1's (ones) are entered for bits 0 to 28 (53).

In the case of the BRA:D instruction 32 shown in FIG. 3(d), the literal #d8 34 enters bit 23 to bit 30 (54) of the 32-bit operand and 0's (zeros) are entered for bits 0 to 22 (56) and bit 31 (58).

Figure 4:
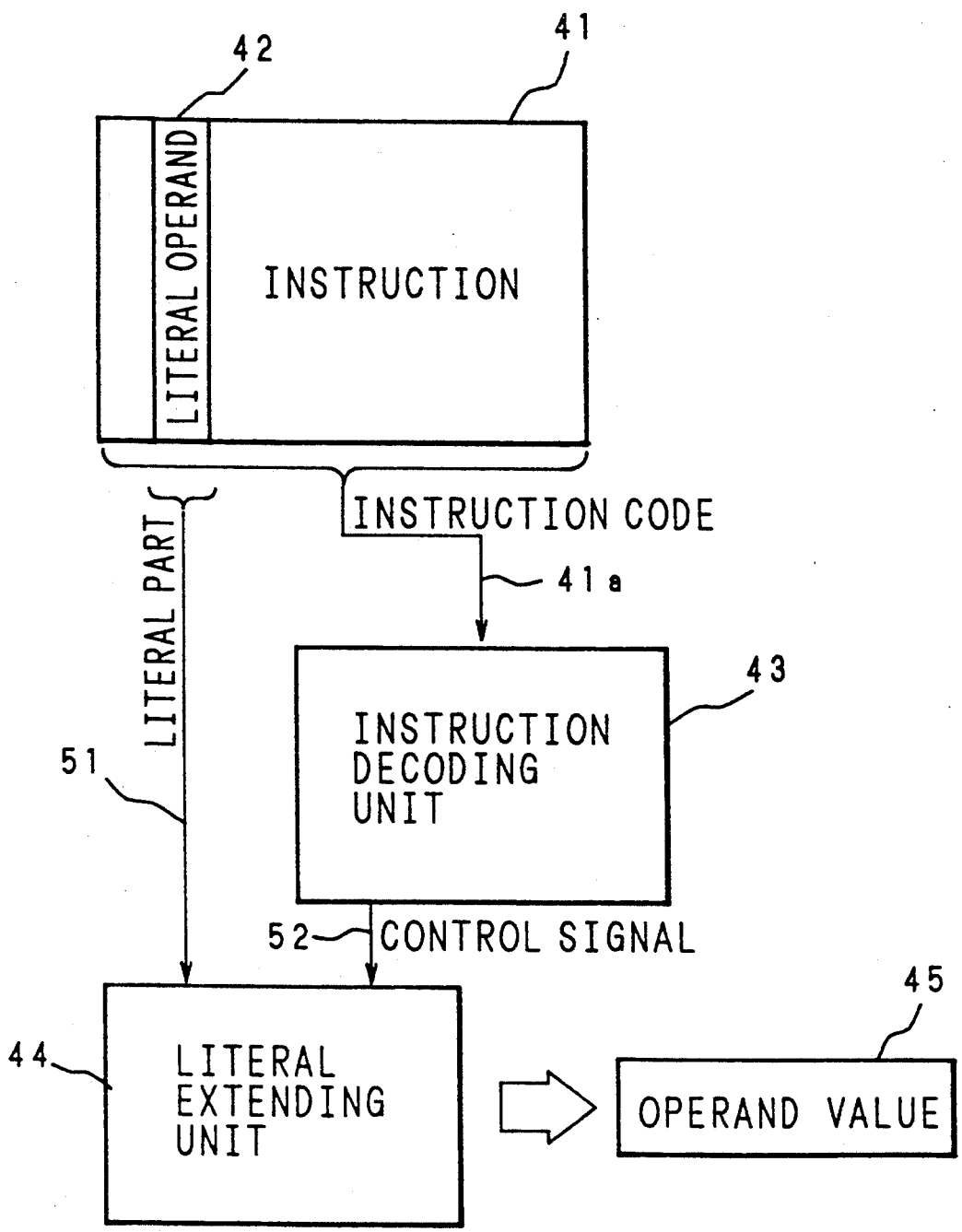
FIG. 4 is a block diagram showing how instructions are fed into the instruction decoding unit and literal operand in the literal extending unit according to the present invention.

FIG. 4 shows a block diagram of the construction of the main portion of the data processor according to the present invention which is equipped with a literal extension function.

In FIG. 4 illustrates how instructions are fed into the instruction decoding unit and literal operands into the literal extending unit, FIG. 4, the reference number 41 is an instruction including literals as shown in FIGS. 1A to 1D, reference numeral 42 is a literal within the instruction, 43 is an instruction decode unit for decoding instruction and generating the control signal to be required, 44 is a literal extension unit 702, and 45 is an operand value. The reference numeral 51 denotes a signal line which transfers 704 the literal part 42 to the literal extension unit 44, and 52 is a signal for controlling the literal extension unit 44 from the instruction decode unit 43 and representing the bit width and the kind of a literal 710.

When the instruction 41 is introduced via line 41a into the instruction decode unit 43, the instruction decode unit 43 sends the bit width and the kind of the literal 42 to the literal extension unit 44. The literal extension unit 44 then extends the literal 708 according to the control signal 52 (containing the bit width and the kind of the literal) from the instruction decode unit 43 to generate the operand value 45 (as shown in FIG. 3(a)–(d)).

Figure 5:
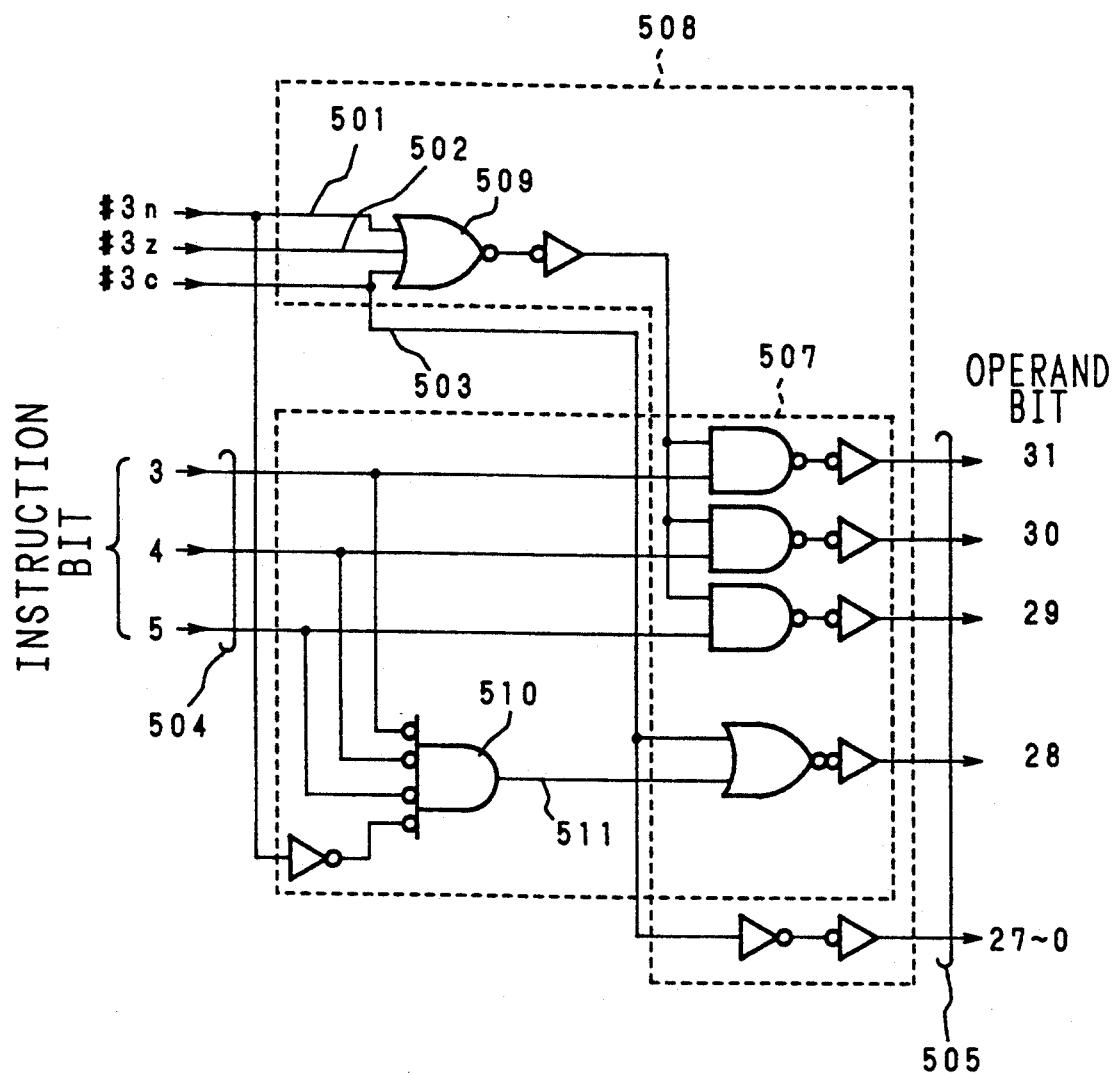
FIG. 5 is a circuit diagram showing an example of a logical circuit arrangement in the literal extending unit of the data processor according to the present invention.
Figure 6:
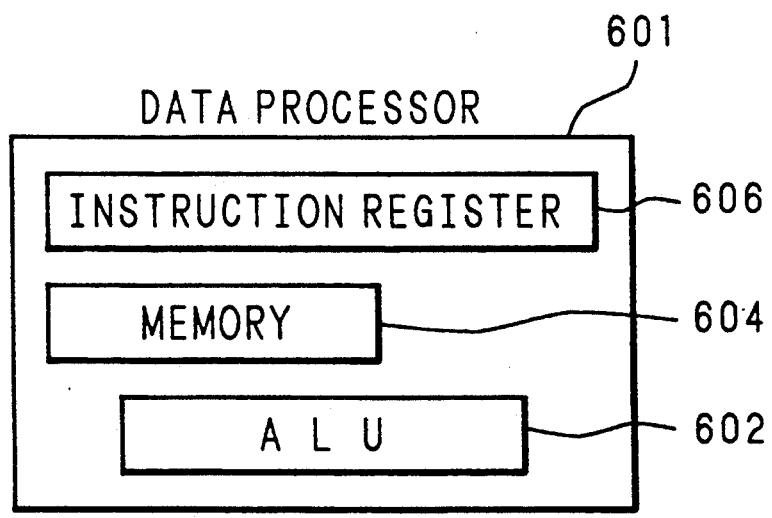
Figure 7:
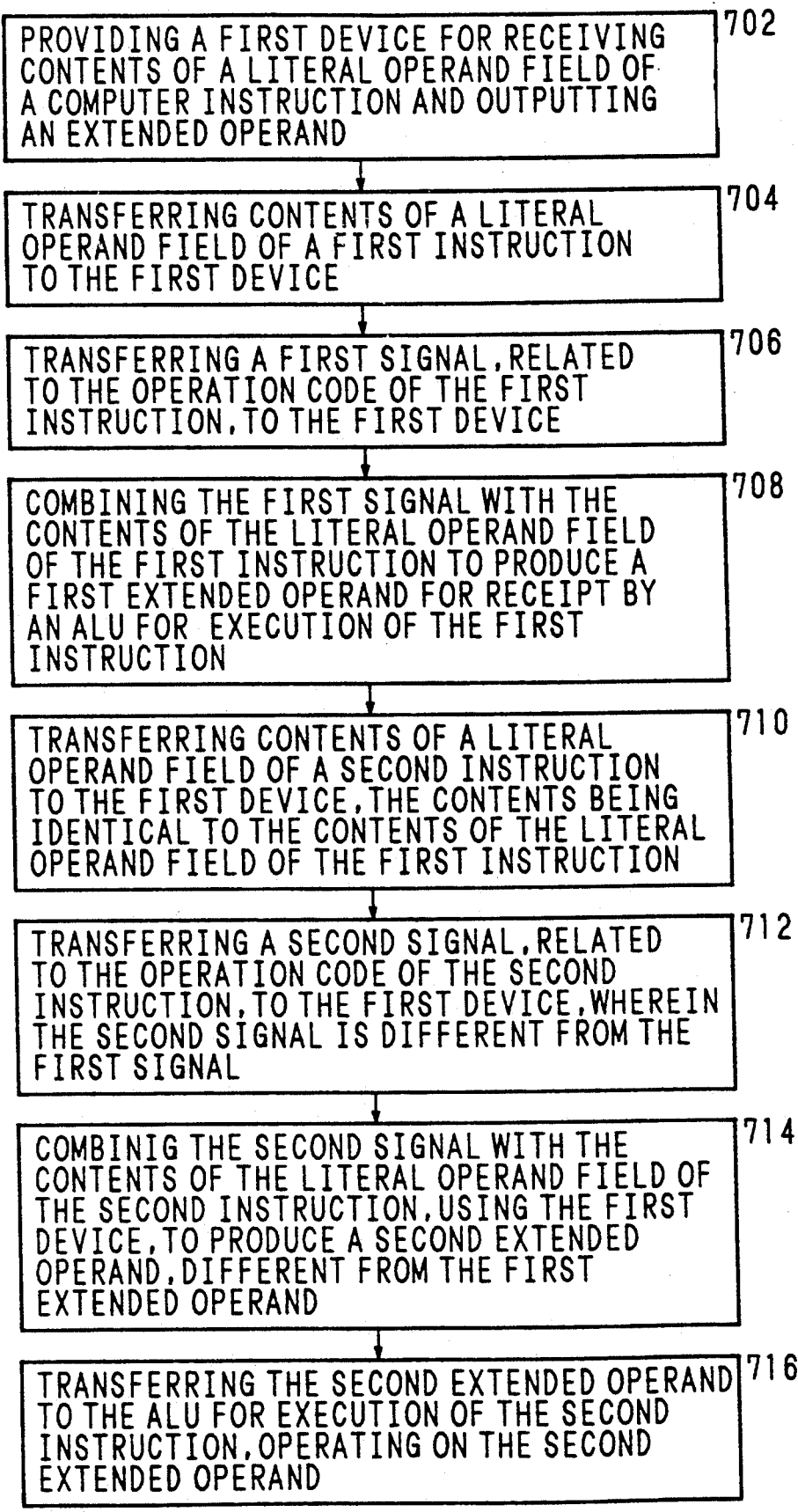

FIG. 5 shows an embodiment of a logical circuit to implement the literal extension unit 44 shown in FIG. 4, which is applied to extend the 3-bit literal shown in FIG. 3.

In FIG. 5, the reference numerals 501 through 503 denote control signals fed from the instruction decode unit 43 in which 501 is the signal indicating the literal is type 706, 502 is the signal indicating the literal is type #3z 712, and 503 is the signal indicating the literal is type #3c. The one of those signals 501, 502, 503 which becomes high level indicates the kind of the literal. Plural lines do not become high level simultaneously.

The reference numeral 504 is a signal line for the literal part 42 of the instruction 41. In the example shown in FIG. 5, since the literal is 3 bits and the instruction bits are bit 3 to bit 5 as shown in FIG. 1(a) to (d), bit 3 to bit 5 are inputted as a literal.

The reference numeral 505 is a signal line for the operand value 45. Although the example shown in FIG.

5 describes the case of a 3-bit literal extension 714, a similar logical circuit can be composed for the application to a literal of 4, 6 or 8 bits. Since the description of a literal of 4, 6 or 8 bits is omitted in FIG. 5, no bit width from the instruction decode unit 43 is inputted.

As mentioned above, according to the present invention, the range which is expressible by constant data of N bits can be selected from among 1 to $2^N$, $-1$ to $-2^N$, or 0 to $2\times(2^N-1)$ according to the instruction. By this construction, a data processor in which the range expressible by a constant data contained in an instruction is extended and the number of instructions may be reduced 716.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. In a computer having an ALU and an instruction register, apparatus for processing a plurality of computer instructions stored in a computer memory, including at least a first computer instruction and a second computer instruction said first computer instruction and said second computer instruction both being part of said plurality of computer instructions, said first computer instruction having an operation code and at least a first field for holding a literal operand having a binary value, said literal operand which is held in said first field in said first computer instruction being a first of a plurality of kinds of literal operands, each of said plurality of kinds of literal operands having a range of permissible values different from the range of all others of said plurality of kinds of literal operands said second computer instruction having an operation code and at least a first field for holding a literal operand having a binary value, said literal operand which is held in said first field in said second computer instruction being a second of said plurality of kinds of literal operands the contents of said first field of said first computer instruction being identical to the contents of said first field of said second computer instruction, the operation code of said second computer instruction being different from the operation code of said first computer instruction, the apparatus comprising:

an instruction decoding means for sequentially receiving said first computer instruction and said second computer instruction and sequentially outputting to a first signal line for control of a literal operand extension, a first signal indicating the kind of literal operand held in said first field of said first instruction and a second signal indicating the kind of literal operand held in said first field of said second instruction;

literal operand extension means, coupled to said instruction decoding means, to sequentially receive said first and second signals from said instruction decoding means and coupled to the instruction register to sequentially receive contents of said first literal operand field obtained from said first computer instruction and said first literal operand field obtained from said second computer instruction, said literal operand extension means being a means for selectively changing the values of said received first and second literal operand fields and sequentially outputting a first and second extended operand to a second signal line, said first extended operand being output in response to said first signal and said contents of said first literal operand field obtained from said first instruction having a first operation code, said first extended operand being different from said second extended operand;

said first and second extended operands being output by said literal operand extension means for receipt by the ALU for execution of said first instruction operating on said first extended literal operand and for execution of said second instruction operating on said second extended literal operand; and means, coupled to said literal operand extension means, for transferring contents of said first field of said first computer instruction to said literal extension means when said first computer instruction is transferred into said instruction decode unit, for extension of the contents of said literal operand field.

2. Apparatus, as claimed in claim 1, wherein said literal extension means includes means for receiving contents of a third literal operand field after receiving said contents of said first literal operand field obtained from said first computer instruction and said second literal operand field obtained from said second computer instruction, and outputting a third extended operand to said second signal line, said first extended operand being different from said third extended operand, said contents of said third literal operand field being identical to the contents of said first field in said first computer instruction and the contents of said first field in said second computer instruction, said third literal operand field being part of a third instruction having a third operation code, said third operation code being different from said first and second operation codes.

3. Apparatus, as claimed in claim 1, wherein said first field has a width of N bits wherein N is greater than zero and wherein said extended operands have values within one of first, second, third and fourth ranges of values, said first range of values being from 0 to $2^N-1$,
said second range of values being from 1 to $2^N$,
said third range of values being from $-1$ to $-2^N$, and
said fourth range of values being from 0 to $2\times(2N-1)$.

4. Apparatus, as claimed in claim 1, wherein said literal extension means includes means for combining at least said first signal and said literal operand which is held in said first field in said first computer instruction to provide said first extended operand.

5. In a computer having an ALU, a method for processing computer instructions having at least an operation code and a first field said first field being a field for holding a binary literal operand having a first bit width of N bits whereby the range of values which can be expressed by said binary literal operand is 0 to $(2^N-1)$, the method comprising:

providing first means for receiving contents of a literal operand field and outputting an extended operand;

transferring contents of a literal operand field of a first instruction to said first means;

transferring a first control signal to said first means; and combining said first signal with said contents of said literal operand field of said first instruction, using said first means, to produce a first extended operand for receipt by the ALU for execution of said first instruction, said first instruction being an instruction for operating on said first extended operand, said first extended operand having one of a plurality of possible values, wherein the range of said plurality of possible values is different from 0 to $(2^N-1)$;

transferring contents of a literal operand field of a second instruction to said first means, said contents of said literal operand field of said second instruction being identical to said contents of said literal operand field of said first instruction;

transferring a second control signal to said first means, wherein said second signal is different from said first signal; and combining said second signal with said contents of said literal operand field of said second instruction, using said first means to produce a second extended operand, different from said first extended operand;

transferring said second extended operand to the ALU for execution of said second instruction, said second instruction being an instruction for operating on said second extended operand.

6. In a computer having a storage means storing a plurality of instructions, each of said plurality of instructions including an operation code, said plurality of instructions including at least a first instruction and a second instruction, said first instruction including at least a first field for holding a literal operand, said literal operand held in said first field in said first instruction having an effective range and said literal operand held in said first field in said first instruction being a first of a plurality of kinds of literal operands, said second instruction including at least a first field for holding a literal operand, said literal operand held in said first field of said second instruction having an effective range and said literal operand held in said first field in said second instruction being a second of said plurality of kinds of literal operands each of said plurality of kinds of literal operands having a range of permissible values different from the range of all others of said plurality of kinds of literal operands, apparatus for extending said effective range of at least said literal operand held in said first field of said first instruction and said literal operand held in said first field of said second instruction comprising:

signal lines for inputting N instruction bits representing a literal operand input from said first instruction;

means for interpreting said operation code of said first instruction and outputting a plurality of type signals indicating said first of said plurality of kinds of literal operands;

means, coupled to said means for interpreting and outputting, for combining said type signals to provide at least a first output signal;

means, coupled to said signal lines and said means for combining said type signals, for combining each of said N instruction bits with at least said first output signal to provide N bits of a literal operand output;

means, coupled to said signal lines and said means for interpreting and outputting, for combining at least a first of said type signals with said N instruction bits to provide a second output signal; and means for combining said second output signal with a second of said type signals to provide a N+1st bit of said literal operand output.

* * * * *